United States Patent

[11] 3,591,801

| [72] | Inventor | Emmet S. Watson |
| | | Ridgefield, Conn. |
| [21] | Appl. No. | 714,906 |
| [22] | Filed | Mar. 21, 1968 |
| [45] | Patented | July 6, 1971 |
| [73] | Assignee | Picker Corporation |

[54] DOUBLE BEAM OPTICAL ABSORPTION PHOTOMETER HAVING SAMPLE AND REFERENCE CHAMBERS POSITIONED ALONG A SINGLE OPTICAL AXIS
18 Claims, 6 Drawing Figs.

[52] U.S. Cl. .................................................. 250/43.5,
    250/83.3, 250/210, 324/62, 356/206
[51] Int. Cl. ................................................ G01n 21/26
[50] Field of Search .................................... 250/43.5,
    83.3; 83.3 UV, 210; 356/206; 324/62, 99

[56] References Cited
UNITED STATES PATENTS

| 3,287,557 | 11/1966 | Bartz | 250/43.5 |
| 3,416,076 | 12/1968 | Clinton | 324/57 |
| 3,454,880 | 7/1969 | Ries et al. | 324/99 X |
| 2,709,751 | 5/1955 | Meyer | 250/43.5 |
| 2,775,160 | 12/1956 | Foskett et al. | 250/43.5 X |
| 3,247,413 | 4/1966 | Bisso et al. | 250/83.3 UV |

OTHER REFERENCES

JOURNAL OF THE OPTICAL SOCIETY, Volume 36, No. 4, Wright et al., April, 1946, pages 195 to 202.

JOURNAL OF THE OPTICAL SOCIETY, Volume 40, No. 2, Kwenson, February, 1950, pages 112,113.

Primary Examiner—James W. Lawrence
Assistant Examiner—A. L. Birch
Attorney—Watts, Hoffmann, Fisher & Heinke ABSTRACT: A simple, high performance double beam optical absorption photometer for use in chemical analysis instruments is described. Two small cylindrical chambers for sample and reference liquids are positioned side by side and along a single optical axis. Collimated ultraviolet radiation from a single source is passed lengthwise through both chambers and the relative absorption of sample and reference liquids sensed by a dual photodetector. A Wheatstone bridge circuit containing the photodetector elements is excited by a feedback power supply and provides linear absorbance readout.

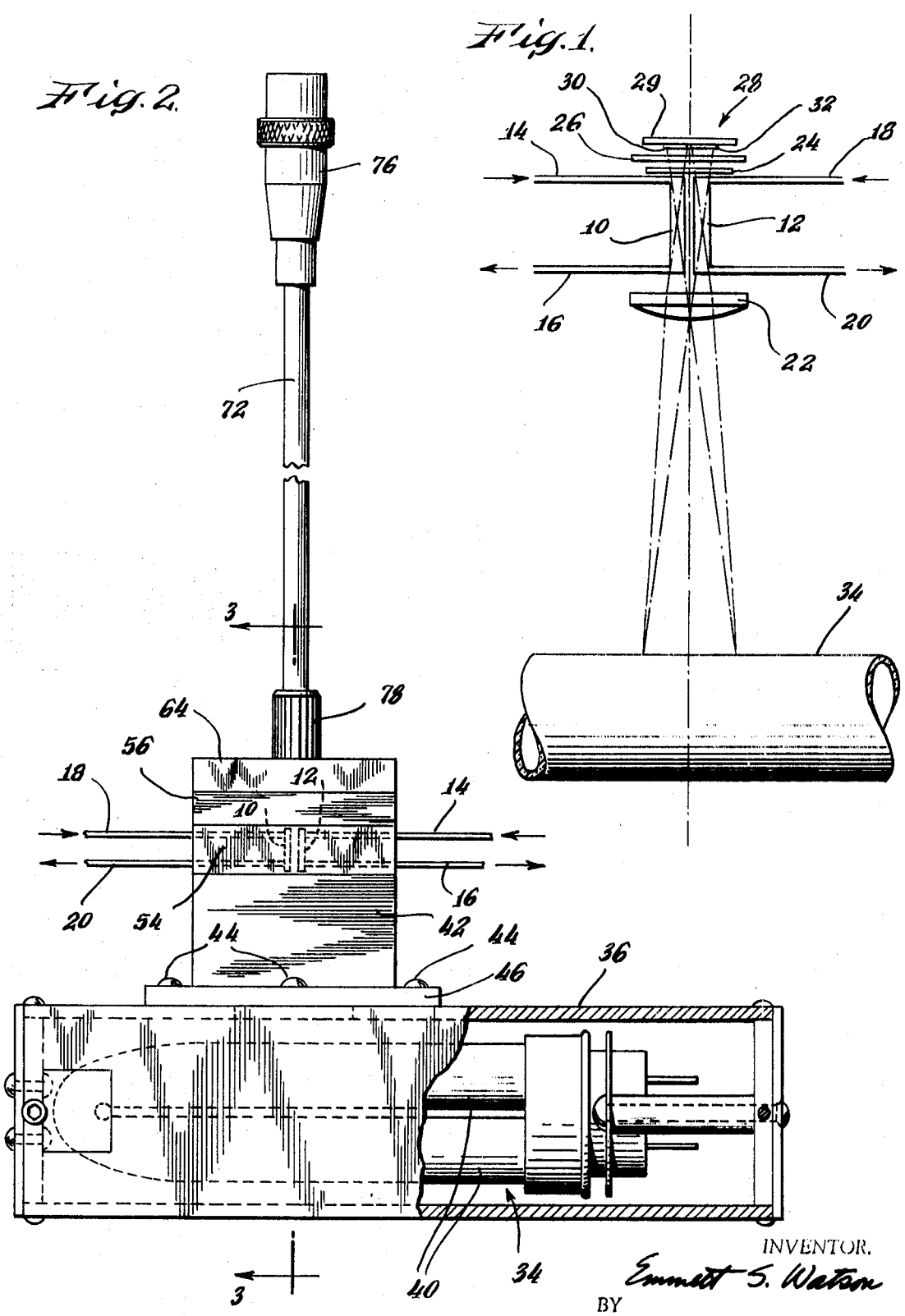

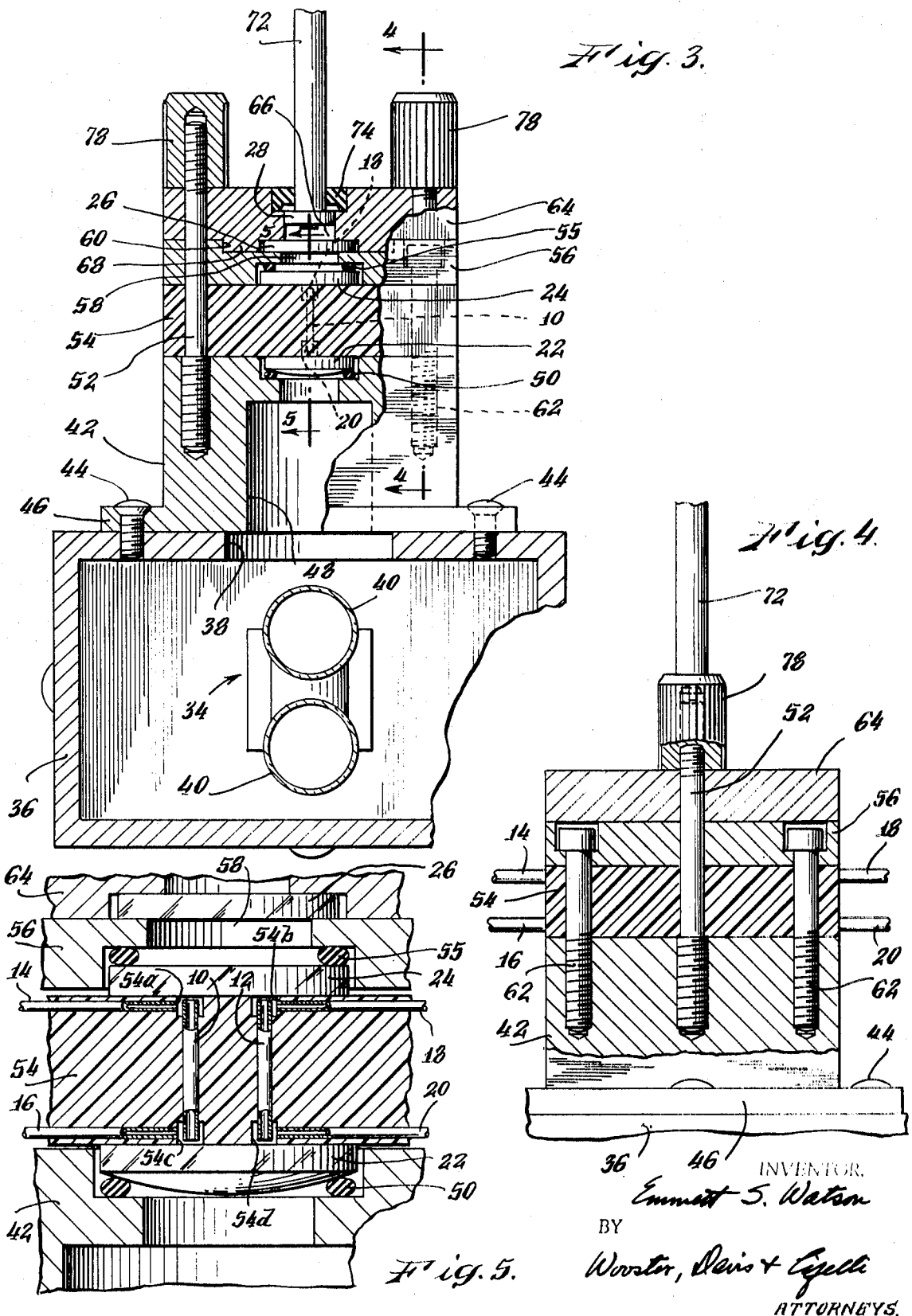

DOUBLE BEAM OPTICAL ABSORPTION PHOTOMETER HAVING SAMPLE AND REFERENCE CHAMBERS POSITIONED ALONG A SINGLE OPTICAL AXIS

BACKGROUND OF THE INVENTION

This invention pertains to the field of optical absorption photometry, also known as "densitometry" (or "spectrophotometry" when the spectral character of the absorption is of interest). In chemistry, for example, the measurement of the light absorbing properties of materials has long been used for both qualitative and quantitative analysis; and many procedures and devices for such measurements have long been known to the prior art. More recently, absorption photometry has also been combined with other methods of analysis. For example, ultraviolet absorption has become a widely used method for monitoring the effluent from liquid chromatography columns; and it is to this application that the present invention is particularly directed, but not limited.

In liquid column chromatography, the effluent monitor or "detector" measures and records the concentration of the separated solutes as they emerge from the column in the eluting solvent. Particularly when using small diameter columns, the detector must be capable of measuring extremely small changes in solute concentration in extremely small volumes of solution. This means that an optical absorption detector must have a measuring chamber of very small volume to avoid solute mixing effects, yet have a reasonably long optical path length for high sensitivity. At the same time, the optical field and aperture of the measuring chamber must be adequate to pass sufficient light for the measurement to be made. Furthermore, to be useful at high sensitivity, the detector must have an extremely stable photometer system.

For many reasons well known to the prior art, a double beam photometer system with ratio readout is inherently more stable than a single beam system since spurious common mode effects do not appear in the readout. In addition, since solute concentration is proportional to absorbance in accordance with the Beer-Lambert law, it is desirable to convert the absorption measurement to linear absorbance readout. Therefore, prior art devices intended for high performance are of the double beam type with full ratio readout in linear absorbance. However, even instruments of this type suffer disadvantages inherent in the prior art. Of basic importance is the face that prior art double beam instruments invariably employ separate optical axes for the two beams. This requires separate optical components for the two beams and creates the problem of optical alignment instability between the two beams, which limits usable sensitivity. Prior art instruments using a chopper and a single detector suffer the further disadvantages of complexity, and the need for moving parts which may fail. Alternatively, those using two detectors suffer the disadvantages of matching and tracking problems between separate detectors. For these and other reasons, prior art devices have disadvantages in terms of performance, complexity, reliability, and cost.

Accordingly, it is the primary object of the present invention to provide an improved double beam absorption photometer for chemical analysis. Other objects are to provide such an instrument which is highly stable and sensitive; which is capable of use with extremely small volumes; which has ratio readout in linear absorbance; and which is simple, compact, reliable, and inexpensive.

SUMMARY OF THE INVENTION

The objects of the invention are achieved by employing a novel single axis optical system with inherent stability and requiring a minimum of parts. The novel use of a small dual photoconductive cell with its inherent matching between elements and its economy is made possible by the close spacing of sample and reference absorption chambers. A novel feedback circuit provides full ratio readout in linear absorbance with a minimum of electrical complexity.

BRIEF DESCRIPTION OF THE DRAWINGS

The construction and operation of the photometer of this invention may be best understood by reference to the attached drawings wherein:

FIG. 1 is a schematic illustration of the optical path of the photometer;

FIG. 2 is a side view of an actual photometer assembly incorporating the present invention;

FIG. 3 is an enlarged cross section taken substantially along the line 3-3 of FIG. 2;

FIG. 4 is a cross section taken substantially along the line 4-4 of FIG. 3;

FIG. 5 is an enlarged cross section taken substantially along the line 5-5 of FIG. 3.

DESCRIPTION OF THE PREFERRED EMBODIMENT

Figure 6:
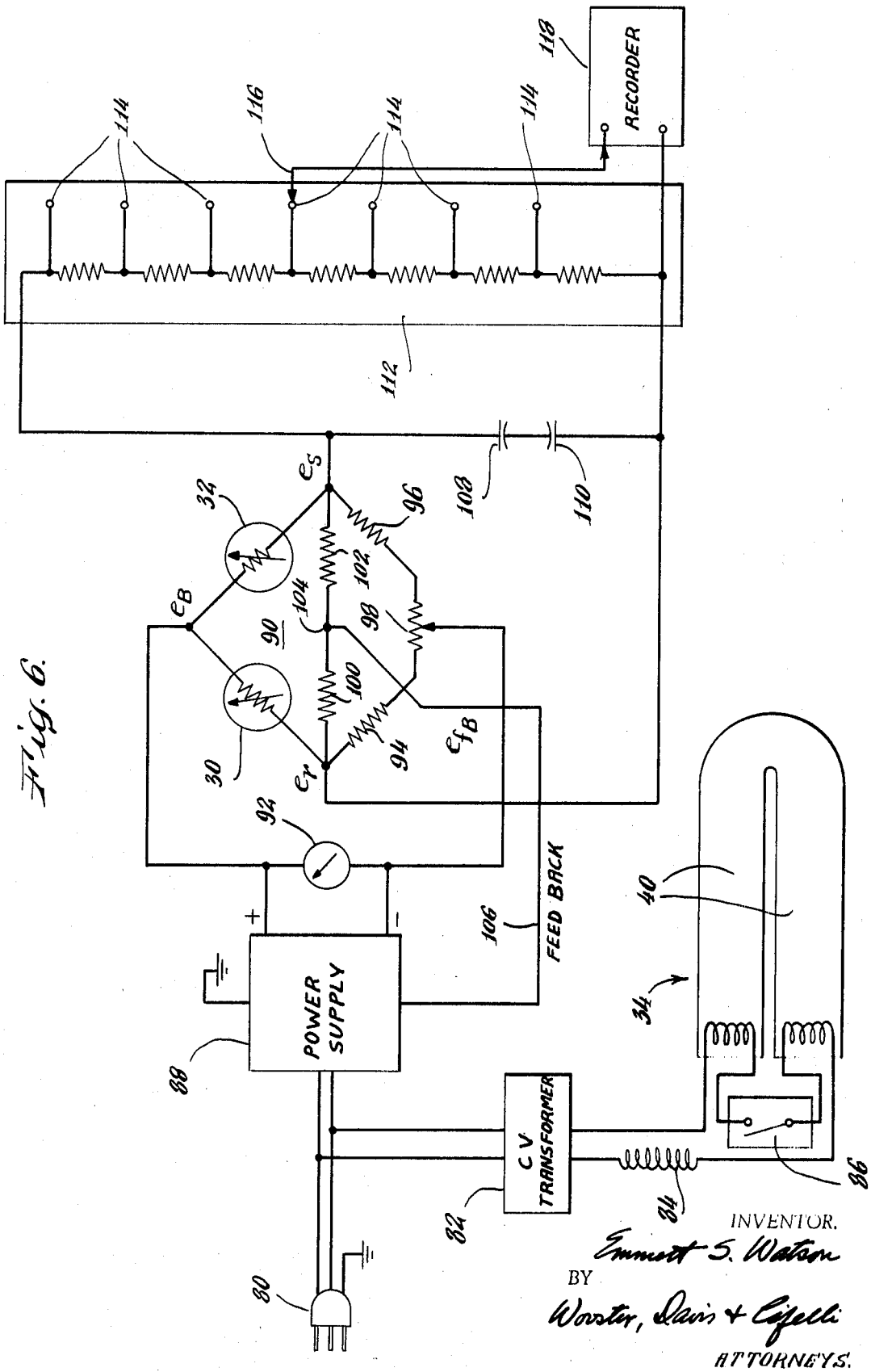
FIG. 6 is an electrical schematic diagram of the photometer of this invention.

While the novel principles of the photometer of this invention have application to several fields of instrumental analysis, it will be described herein primarily in terms of a double beam ultraviolet detector for analyzing the effluents of a dual column liquid chromatograph.

FIG. 1 illustrates such a detector schematically wherein a reference chamber 10 and a sample chamber 12 are placed in close proximity in parallel relationship. A reference fluid inlet line 14 and a reference fluid outlet line 16 are connected to opposite ends of reference chamber 10. A sample fluid inlet line 18 and a sample fluid outlet line 20 are connected to opposite ends of sample chamber 12. These lines are connected to receive and discharge the effluents from the sample and reference columns of a dual column liquid chromatograph.

A planoconvex lens 22 is positioned at the source end of the chambers and a plane window 24 is positioned at the detector end. A filter 26 which permits only ultraviolet radiation to reach a dual detector assembly 28 is mounted adjacent the window 24.

The dual detector assembly 28 includes a common substrate 29 having mounted thereon two separate photosensitive detectors, referred to herein as the reference detector 30 and the sample detector 32. Each of these detectors is a cadmium sulfide photoconductive cell whose sensitive area is coated with a zinc silicate phosphor. The excitation spectrum of the phosphor is peaked at 254 millimicrons and its fluorescence emission spectrum is peaked at 540 millimicrons, at which the photoconductive response of cadmium sulfide is also peaked. A relatively large source 34 of ultraviolet radiation supplies the radiant power to the detector assembly. In the described embodiment, this source produces primarily mercury resonance radiation at 254 millimicrons. This combination efficiently converts the ultraviolet radiation falling on detectors 30, 32 into corresponding electrical signals. The combined spectral selectivities of source 34, filter 26, phosphor, and photoconductor result in an overall spectral response which is essentially monochromatic at 254 millimicrons.

The lens 22 is located at its focal distance from source 34. Accordingly, the radiation which passes through the reference and sample chambers 10, 12 is collimated. As the axes of these chambers are mutually parallel, two beams which pass directly through them will have originated from a common area of the source lamp 34. A principal advantage of using a common source area for both beams is the fact that spatial variations in lamp brightness as a result of temperature changes, dust accumulation, mercury condensation, etc. are common to the two beams and thus do not affect the detector readout. Furthermore, since the chambers are quite close together, the two beams view the source at very nearly the same angle.

The high sensitivity of the optical system schematically illustrated in FIG. 1 is assisted by the high aspect ratio of the chambers. For example, in a particular embodiment, these chambers may have lengths of 10 millimeters but diameters of only 1 millimeter. This gives a significant absorption path length but a chamber volume of only 8 microliters. It will also be noted that, as both the aperture and field of each chamber are completely filled by the optical system, there is the maximum possible direct transmission of ultraviolet energy from the source 34 to the photodetectors 30, 32.

Unusual stability of the optical system is achieved in the device of FIG. 1 as the result of employing a single optical axis and a single set of optics common to both beams. There is thus no need to adjust and maintain the alignment between two separate axes defined by separate optical components. In effect, the aperture is split at lens 22 into two conjugate beams defined by the apertures and fields of the chambers 10, 12. Mutual stability between the axes of chambers 10, 12 is achieved by mounting the chambers in a single block of material. It will also be noted that the emergent beams are quite close together. This permits the use of the small dual photoconductive detector assembly 28 instead of the separate photocells commonly used in conventional instruments. The matching of photoelectric and thermal properties of the two halves of a dual photoconductive cell are much better than the matching between separate cells. Moreover, the two halves are close together and thermally coupled by a common ceramic substrate 29 so that differential temperature sensitivity is greatly reduced from the situation which prevails when separate cells are used. As a result, the tracking between reference detector 30 and sample detector 32 is excellent, thus contributing to the stability of the overall system.

The actual mechanical construction of the detector schematically illustrated in FIG. 1 is illustrated in FIGS. 2—5. The detector assembly comprises an enclosed lamp shield 36 having an upper wall defining a radiation opening 38 therein. Mounted within the lamp shield 36 is the source 34 comprising a low-pressure, hot cathode, mercury lamp 40 of commercial manufacture. Positioned atop the lamp shield 36 is a fluid cell holder 42, the holder being secured to the lamp shield by means of screws 44 extending through a flange 46. The fluid cell holder 42 defines a central light passage 48 which is of reduced diameter at its upper end and defines a recess containing a resilient O-ring 50. Threadedly mounted in the fluid cell holder 42 and extending upwardly therefrom are a pair of alignment studs 52 which are threaded at their upper ends.

Mounted atop the fluid cell holder 42 and properly aligned by means of passages engaging studs 52 is a Teflon fluid cell 54. The fluid cell 54 is drilled vertically to define openings receiving the tubular reference chamber 10 and sample chamber 12 described in reference to FIG. 1. In addition, cell 54 is drilled horizontally to receive the ends of the small tubes which form the reference fluid inlet line 14 and outlet line 16 and the sample fluid inlet line 18 and outlet line 20. The reference and sample chambers are slightly shorter than the thickness of fluid cell 54 and are surrounded at each end by an inlet recess 54a, 54b and an outlet recess 54c, 54d. The ends of the corresponding inlet and outlet lines extend into these recesses as shown in FIG. 5. Lens 22 is pressed against the lower surface of fluid cell 54 by a compressed O-ring 50 to seal the lower ends of the chambers.

Positioned on the top surface of the fluid cell 54 is a fluid cell clamp member 56. Clamp member 56 also includes passageways for engaging studs 52 and a central optical passage 58 which is enlarged at the lower surface to define a recess containing window 24 and O-ring 55. O-ring 55 is compressed in the assembled detector and forces window 24 against the upper surface of fluid cell 54 to seal the upper ends of the chambers.

The clamp member 56, fluid cell 54, and fluid cell holder 42 are secured together by means of four cap screws 62 having their heads recessed in clamp member 56 and extending through fluid cell 54 into threaded engagement with fluid cell holder 42. Tightening of cap screws 62 compresses O-rings 50, 55. It will thus be apparent from FIG. 5 that a reference fluid passageway exists from inlet line 14 to outlet line 16 via recess 54a, chamber 10, and recess 54c. A similar passageway for sample fluid exists from inlet line 18 to outlet line 20 via recess 54b, chamber 12, and recess 54d.

Mounted against the top surface of clamp member 56 is a photocell holder 64. The photocell holder also includes passages engaging studs 52. The holder defines a central light passage 66 and its lower surface includes an annular projection 68 which mounts within recess 60. Positioned within the annular projection 68 is the ultraviolet filter 26. Positioned within the light passage 66 and above the filter 26 if the dual photocell assembly 28 from which extends a three-conductor cable 72 enclosed by a suitable potting compound 74. The end of the cable is provided with a suitable plug 76. Photocell holder 64 is clamped to the rest of the assembly by means of knurled nuts 78 threaded on studs 52.

The electrical circuit of this invention is illustrated schematically in FIG. 6. A supply plug 80 is connectable to a standard alternating current source of electrical power such as 117 volt, 60 Hz. This supply is connected to a constant voltage transformer 82 which energizes the ultraviolet source lamp 40 through a ballast 84 and starter 86. The same source supplies a feedback power supply 88. The output of the power supply is variable between approximately 5 and 30 volts and is applied across the input of a Wheatstone bridge 90 and across a voltmeter 92. Included in the Wheatstone bridge are reference detector 30 and sample detector 32 forming two legs of the bridge. The other two legs are formed by resistors 94 and 96 and a zero adjustment potentiometer 98. Across the output of the bridge 90 are two resistors 100, 102 of equal value connected at their common point 104 by a feedback line 106 to power supply 88. Also connected across the output of the bridge 90 are a pair of filter capacitors 108, 110 and a range selector switch 112 having the usual taps 114 and selector 116. The output of the range selector switch is applied to a recorder 118.

The zero adjustment potentiometer 98 is employed initially to balance the bridge for zero output and thereby establish the chromatogram base line at the zero level of the recorder chart. Assuming, now, that an ultraviolet absorbing solute emerges from the analytical column and passes through the sample chamber 12, the amount of ultraviolet radiation reaching sample detector 32 will be reduced. The reference and sample detectors function as radiation sensitive resistors whose resistance is substantially inversely proportional to the intensity of the ultraviolet radiation impinging upon them. Accordingly, the bridge becomes unbalanced and an output voltage is applied across the range selector switch 112 and transmitted to recorder 118 which records a chromatographic peak.

If the bridge excitation voltage were constant, the readout at recorder 118 would be zero stabilized against common mode effects but would not be range stabilized. In other words, the zero base line of the chromatogram would not be affected by variations in lamp brightness or common mode solvent absorption, but the range sensitivity to absorption peaks would be affected by such changes. For example, a decrease in lamp brightness caused by temperature change or lamp aging would result in a corresponding decrease in range sensitivity. Therefore, the feedback power supply 88 has the further function of compensating for these effects, thus stabilizing the readout in range as well as zero.

The feedback power supply 88 operates to maintain the voltage at common point 104 constant under all conditions. To understand this operation, let us first assume that feedback line 106 is connected, not to common point 104, but to the reference leg of the bridge labeled $e_r$. This voltage is proportional to the radiation falling on reference detector 30 and is also proportional to the bridge excitation voltage. Assume now that the lamp brightness decreases, tending to decrease the voltage at $e_r$. Such a change would be sensed by feedback power supply 88 which would automatically increase the excitation voltage $e_B$ to compensate for the loss in brightness and maintain $e_r$ constant. The sample arm voltage $e_s$ would be affected in the same proportion. It will thus be seen that the bridge output voltage would be independent of changes in lamp brightness and other common mode variations and would be directly proportional to the absorption of the sample fluid relative to that of the reference fluid.

It will be noted that the circuit described in the preceding paragraph would provide full ratio readout, stabilized in range as well as zero. However, the readout would be linear absorption which, in accordance with the Beer-Lambert law, is a nonlinear function of solute concentration. Therefore, the feedback power supply has the further function of converting linear absorption to linear absorbance to thereby provide a readout which is directly proportional to solute concentration. This is done by making the connection of feedback line 106 to common point 104 between resistors 100, 102. If resistors 100, 102 are of equal value, it will now be seen that the stabilized feedback voltage is the average between $e_r$ and $e_s$. Although the mathematical analysis of this circuit is quite complex, it results in a readout that is a very close match to linear absorbance over a wide range of absorbance values. The match becomes less exact at very high values of absorbance. In some cases, resistors 100, 102 may be of different values to adjust the feedback factor for a better match to linear absorbance. This will depend on photocell characteristics and the absorbance range to be covered.

The overall operation of the readout circuit may be described as follows: When the recorder 118 is zeroed, the bridge 90 will be balanced and the voltages $e_r$, $e_s$ will be equal to each other and to the voltage at point 104. Assuming now that a small attenuation of the radiation reaching sample detector 32 takes place, corresponding to a small value of absorbance, the voltage $e_s$ will decrease slightly. As the voltage at point 104 is equal to the average of the voltages $e_r$ and $e_s$, and as this is a constant, the voltage $e_r$ will be increased by the same amount due to the increase of the excitation voltage $e_B$ from power supply 88. This slightly increases the sensitivity of the bridge in just the right amount to correct for the small nonlinearity of the absorption curve. The same result occurs to a greater degree in the event of a large change in resistance of sample detector 32, the bridge sensitivity being increased further to correct for the greater nonlinearity of the absorption curve. The result is that the absorption measurement is automatically converted to linear absorbance recording.

It is believed that the many advantages of this invention will now be apparent to those skilled in the art. It will also be apparent that a number of variations and modifications may be made in this invention without departing from its spirit and scope. For example, a chopped optical system and a single radiation detector could be employed. However, dual cells are preferred for reasons of cheapness and reliability. Also, the dual photodetector may be displaced from the chambers and an image of the chambers formed thereon by use of appropriate optical elements. Furthermore, while the invention has been described as primarily directed to column chromatography, it will be readily understood that the invention is well adapted to other types of analysis. Accordingly, the foregoing description is to be construed as illustrative only, rather than limiting. This invention is limited only by the scope of the following claims.

What I claim is:

1. Apparatus for double beam absorption photometry which comprises: a single source of electromagnetic radiation; single means for collimating the radiation emanating from substantially each point of radiation on said source into two collimated beams of radiation along a single optical axis; means for defining first and second parallel beams of such collimated radiation the respective fields and apertures of said beams being of substantially equal size; means for placing in said first and second beams respective first and second materials; and means for comparing the intensity of radiation transmitted through said first and second materials to indicate their relative absorption.

2. The apparatus of claim 1 wherein said beam defining means comprise first and second chambers arranged for containing said first and second materials.

3. The apparatus of claim 2 wherein said chambers are substantially cylindrical.

4. The apparatus of claim 2 wherein said chambers are contained within a single member.

5. The apparatus of claim 2 wherein said means for placing comprise inlet and outlet fluid lines communicating with each of said first and second chambers.

6. The apparatus of claim 1 wherein said comparing means comprise first and second photosensitive detectors positioned, respectively, in said first and second beams.

7. The apparatus of claim 6 wherein said radiation is ultraviolet and wherein each of said detectors comprises a photosensitive portion responsive to visible radiation and having a coating of a material which fluoresces in the visible region when excited by ultraviolet radiation.

8. The apparatus of claim 6 wherein said detectors are of the solid state type mounted on a common substrate.

9. The apparatus of claim 6 wherein said comparing means comprises: a Wheatstone bridge including said detectors therein; power supply means connected to energize said bridge; and indicating means responsive to the output of said bridge.

10. The apparatus of claim 1 wherein said single means is an optical lens.

11. The apparatus of claim 1 wherein said single means is a planoconvex optical lens; said lens being disposed between said source and said material placing means, and being positioned so that the convex surface of said lens faces said source of radiation.

12. Apparatus for double beam absorption photometry which comprises: a single source of electromagnetic radiation; single means for collimating said radiation along a single optical axis; means for defining first and second parallel beams of such collimated radiation, the respective fields and apertures of said beams being of substantially equal size; means for placing in said first and second beams respective first and second materials; and means for comparing the intensity of radiation transmitted through said first and second materials to indicate their relative absorption; said comparing means comprise first and second photosensitive detectors positioned, respectively, in said first and second beams; a Wheatstone bridge including said detectors therein; power supply means connected to energize said bridge; and indicating means responsive to the output of said bridge; a voltage divider connected across the output of said bridge; and a feedback line connected between a preselected point of said voltage divider and said power supply, said power supply being responsive to the voltage at said preselected point to maintain said voltage at a substantially constant value.

13. The apparatus of claim 12 wherein said preselected point is at substantially the midpoint of said voltage divider.

14. Apparatus for comparing the electrical resistances of first and second variable resistors which comprises: a Wheatstone bridge including said resistors in adjacent arms therein; a voltage divider connected across the output of said bridge; a power supply connected to energize said bridge and having a feedback voltage input, the output of said power supply being variable in response to a feedback voltage to maintain said feedback voltage at a substantially constant value; a feedback line connected to apply the voltage at a preselected point on said voltage divider to said powersupply feedback voltage input; and indicating means responsive to the output of said bridge.

15. The apparatus of claim 14 wherein said preselected point is substantially at the midpoint of said voltage divider.

16. Apparatus for double beam absorption photometry which comprises: a single source of electromagnetic radiation; collimating means for developing two collimated beams of radiation from the radiation emanating from substantially each position on said source along a single optical axis; the respective fields and apertures of said beams being of substantially equal size; means for placing in said first and second beams respective first and second materials; and means for comparing the intensity of radiation transmitted through said first and second materials to indicate their relative absorption.

17. The apparatus of claim 16 wherein said collimating means is an optical lens.

18. The apparatus of claim 16 wherein said single means is a planoconvex optical lens; said lens being disposed between said source and said material placing means, and being positioned so that the convex surface of said lens faces said source of radiation.